United States Patent
Nagaratnam et al.

(10) Patent No.: US 10,587,423 B2
(45) Date of Patent: Mar. 10, 2020

(54) COGNITIVE PSYCHOLOGY AUTHENTICATION IN MULTI-FACTOR AUTHENTICATION SYSTEMS

(71) Applicant: International Business Machines Corporation, Armonk, NY (US)

(72) Inventors: Nataraj Nagaratnam, Cary, NC (US); Pamela A. Nesbitt, Ridgefield, CT (US); Sandeep Ramesh Patil, Pune (IN); Sasikanth Eda, Vijayawada (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 15/820,957

(22) Filed: Nov. 22, 2017

(65) Prior Publication Data
US 2019/0158477 A1 May 23, 2019

(51) Int. Cl.
*H04L 9/32* (2006.01)
*H04L 29/06* (2006.01)
(Continued)

(52) U.S. Cl.
CPC ............ *H04L 9/3271* (2013.01); *G06F 21/31* (2013.01); *H04L 9/32* (2013.01); *H04L 63/08* (2013.01);
(Continued)

(58) Field of Classification Search
CPC ......... H04L 9/3271; H04L 9/32; H04L 63/08; H04L 2463/082; H04W 12/06; G06F 21/31
See application file for complete search history.

(56) References Cited

U.S. PATENT DOCUMENTS 9,396,319 B2 7/2016 Shuart et al.
9,672,335 B2 6/2017 Shuart et al.
(Continued)

OTHER PUBLICATIONS

Anonymously; "System and Method for Refined (Cognitive) Sets of Questions and Answers"; http://ip.com/IPCOM/000247474D; Sep. 9, 2016.
(Continued)

*Primary Examiner* — Huan V Doan
(74) *Attorney, Agent, or Firm* — Garlick & Markison; Timothy W. Markison; Bruce E. Stuckman

(57) ABSTRACT

A cognitive psychology authentication in a multi-factor authentication system. A request is received to access a secure resource associated with a user. A set of cognitive psychology questions are selected from a plurality of cognitive psychology questions for transmission to a client device associated with the request. A set of responses corresponding to the set of cognitive psychology questions are received and cognitive psychology data is generated based on the set of responses. A cognitive psychology profile associated with the user is retrieved from a database. An authentication score is calculated based on comparing the cognitive psychology data to the cognitive psychology profile. An authentication success notification is transmitted when the authentication score compares favorably to an authentication threshold. An authentication failure notification is transmitted when the authentication score compares unfavorably to the authentication threshold.

20 Claims, 11 Drawing Sheets

(51) Int. Cl.
*G06F 21/31* (2013.01)
*H04W 12/06* (2009.01)
(52) U.S. Cl.
CPC ....... *H04W 12/06* (2013.01); *H04L 2463/082* (2013.01)

(56) References Cited

U.S. PATENT DOCUMENTS

| | | | | | |
|---|---|---|---|---|---|
| 2007/0283416 | A1* | 12/2007 | Renaud | .................... | G06F 21/31 726/2 |
| 2008/0101658 | A1* | 5/2008 | Ahern | ...................... | G06F 21/32 382/115 |
| 2011/0162067 | A1* | 6/2011 | Shuart | ...................... | G06F 21/31 726/19 |
| 2015/0237038 | A1* | 8/2015 | Grajek | ................ | H04L 63/0815 726/8 |
| 2016/0125176 | A1* | 5/2016 | Scea | ....................... | G06F 21/16 726/19 |
| 2016/0170996 | A1* | 6/2016 | Frank | ................ | G06F 16/24578 707/748 |
| 2016/0203402 | A1* | 7/2016 | Hanlon | .................... | G06N 5/02 706/46 |
| 2017/0178142 | A1* | 6/2017 | Dutt | ...................... | G06Q 50/265 |
| 2017/0364675 | A1* | 12/2017 | Vilke | ....................... | G09C 1/00 |
| 2018/0131716 | A1* | 5/2018 | Chantz | ................ | H04L 63/1441 |
| 2019/0065851 | A1* | 2/2019 | Cardis | ................ | G06K 9/00664 |

OTHER PUBLICATIONS

Anonymously; "System for Visualizing and Influencing the Determining Factors for Answers from a Cognitive Question and Answer System"; http://ip.com/IPCOM/000247267D; Aug. 18, 2016.

Nag, AK. et al.; "An Adaptive Approach for Continuous Multi-factor Authentication in an Identify Eco-System"; 2014 9th Cyber and Information Security Research Conference; 2014.

National Institute of Standards and Technology; The NIST Definition of Cloud Computing; Special Publication 800-145; Dec. 13, 2016; pp. M-7 to M-13.

* cited by examiner

Ｕ Ｓ １０，５８７，４２３ Ｂ２

COGNITIVE PSYCHOLOGY AUTHENTICATION IN MULTI-FACTOR AUTHENTICATION SYSTEMS

BACKGROUND

This invention relates to computer networks and more specifically, to authentication in computer networks.

Multi-factor authentication is popular and widely used by services across several industries. Validation of a secure token and/or answers to security questions can be required along with a username and password in determining authenticity of a user requesting access to an account. However, these methods can still be insecure if a username and password are stolen and/or exposed to a hacker. For example, consider a case where a user's mobile device is lost and/or stolen, and a web browser installed on the mobile device stores a username and password for access to a user account of a service. Suppose an application associated with the service stored on the mobile device uses secure token validation along with the username and password for a successful login. As soon as the thief/hacker attempts to login to the account via the stored username and password, the application server sends the secure token to same mobile device, irrespective of the person who attempts to login to the application. This offers a simple security breach, as the thief/hacker can simply enter the received code and be granted access. Similarly, if the thief/hacker knows or has access to other basic information associated with mobile owner, it can be easy to construct answers provided to the security questions posed by the application, such as pet name, first car purchase date, favorite city, mother maiden name, favorite teacher name, etc. For example, a quick web search of the user's name or a quick look at publicly available information posted to a social media profile could offer clues and/or answers to some or all of these questions. The cognitive psychology authentication system presented herein can be utilized to offer secure multi-factor authentication that addresses these issues.

SUMMARY

Embodiments of the present invention disclose a method, computer program product, and system for cognitive psychology authentication in multi-factor authentication system. A request to access a first secure resource by a first user is received. A set of cognitive psychology questions is selected from a plurality of cognitive psychology questions for transmission to a first client device associated with the request for display on a display device of the first client device via a user interface displayed on the display device. A set of responses is received corresponding to the set of cognitive psychology questions, wherein the set of responses is generated by the first client device based on input to the user interface received via an input device of the first client device. Cognitive psychology data is generated based on the set of responses. A cognitive psychology profile associated with the first user is retrieved from a database. An authentication score is calculated based on comparing the cognitive psychology data to the cognitive psychology profile. An authentication success notification is transmitted when the authentication score compares favorably to an authentication threshold. An authentication failure notification is transmitted when the authentication score compares unfavorably to the authentication threshold.

DETAILED DESCRIPTION

Figure 1A:
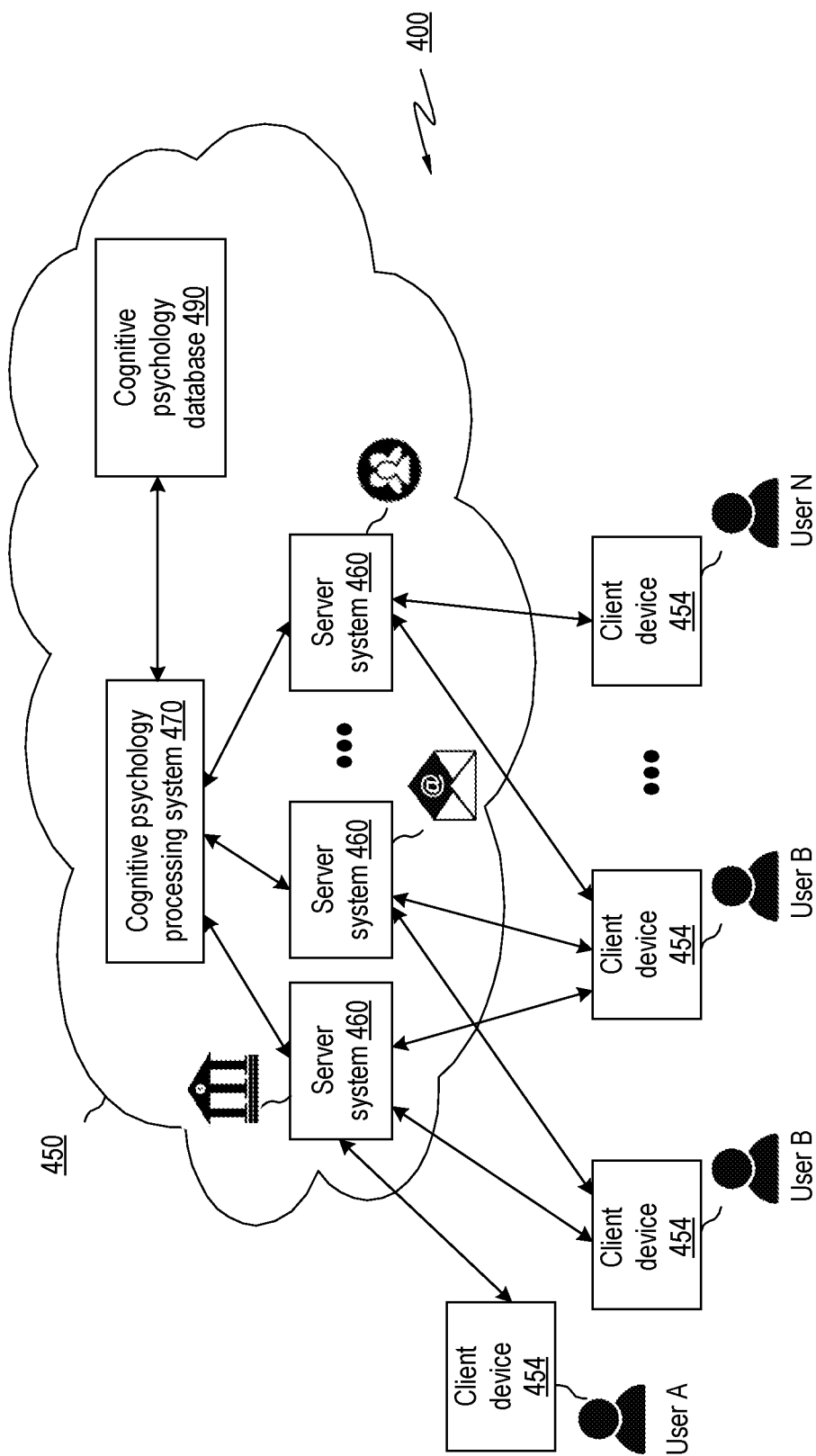
FIGS. 1A-1G are schematic block diagrams of a cognitive psychology authentication system according to various embodiments of the present invention.

FIG. 1A presents a cognitive psychology authentication system 400 that includes a plurality of client devices 454 that communicate with a wired and/or wireless network 450. The network can include a cognitive psychology processing system 470 that communicates bidirectionally with a cognitive psychology database 490 and/or at least one server system 460. A plurality of client devices 454 can bidirectionally communicate with one or more server systems 460 via wired and/or wireless connections. The cognitive psychology processing system 470, cognitive psychology database 490, some or all server systems 460, and/or some or all client devices 454 can each include a processor and/or a memory, and can be implemented by utilizing one or more computing devices 300. In some embodiments, the cognitive psychology database 490 is integrated within a memory of the cognitive psychology processing system 470. In some embodiments, some or all server systems 460 include their own cognitive psychology processing system 470 and/or cognitive psychology database 490. The cognitive psychology authentication system 400 can be operable to offer secure multi-factor authentication.

Each server system 460 can be managed by or otherwise associated with a service and/or entity that stores or otherwise accesses secure resources such as user account data. Such services and/or entities can include banks, email platforms, messaging platforms, social media platforms, online vendors, credit card companies, utilities companies, or other services. In particular, some or all server systems 460 can store and/or access sensitive user information that require authentication to be accessed by a client device 454. Furthermore, the computing platforms that implement any of these services can utilize other secure resources such as secure communication links, system passwords, encryption keys, certificates and other security information, application files, utility files, program registries and other program files, device parameters and settings, secure devices such a secure memory or other device, or any other data element, hardware component or software component associated with a computing platform where secure access is desirable or required.

Each client device 454 can be associated with a user of one or more of the services or entities. For example, a user of the one or more services can have a personal and/or shared account managed by one or more of the services and/or entities, or otherwise seek to access personal information or other information stored by the one or more services and/or entities. A user can utilize their client device to bidirectionally communicate with server systems 460 associated with services and/or entities with which they seek to access information.

Figure 3:
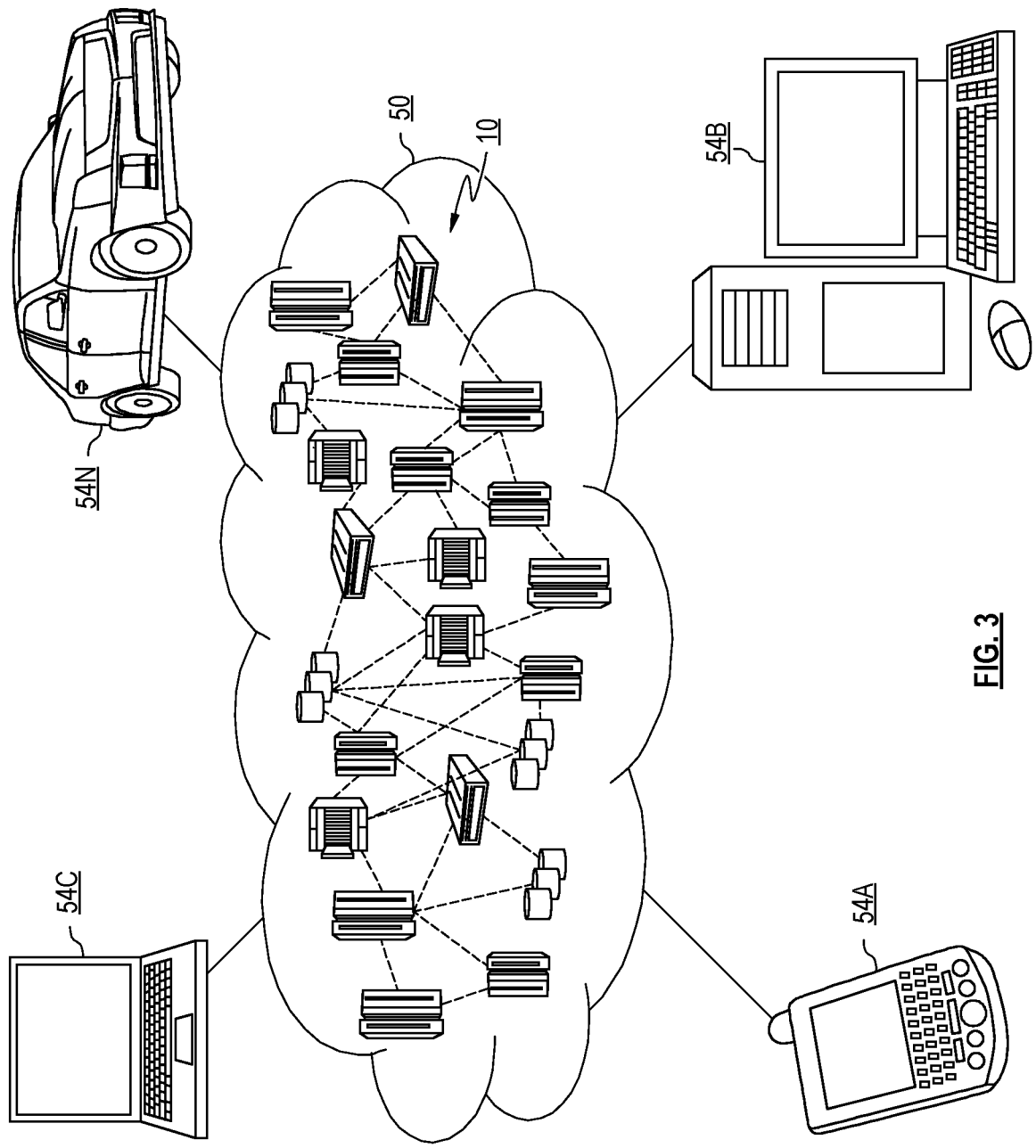
FIG. 3 depicts a cloud computing environment according to various embodiments of the present invention.
Figure 4:
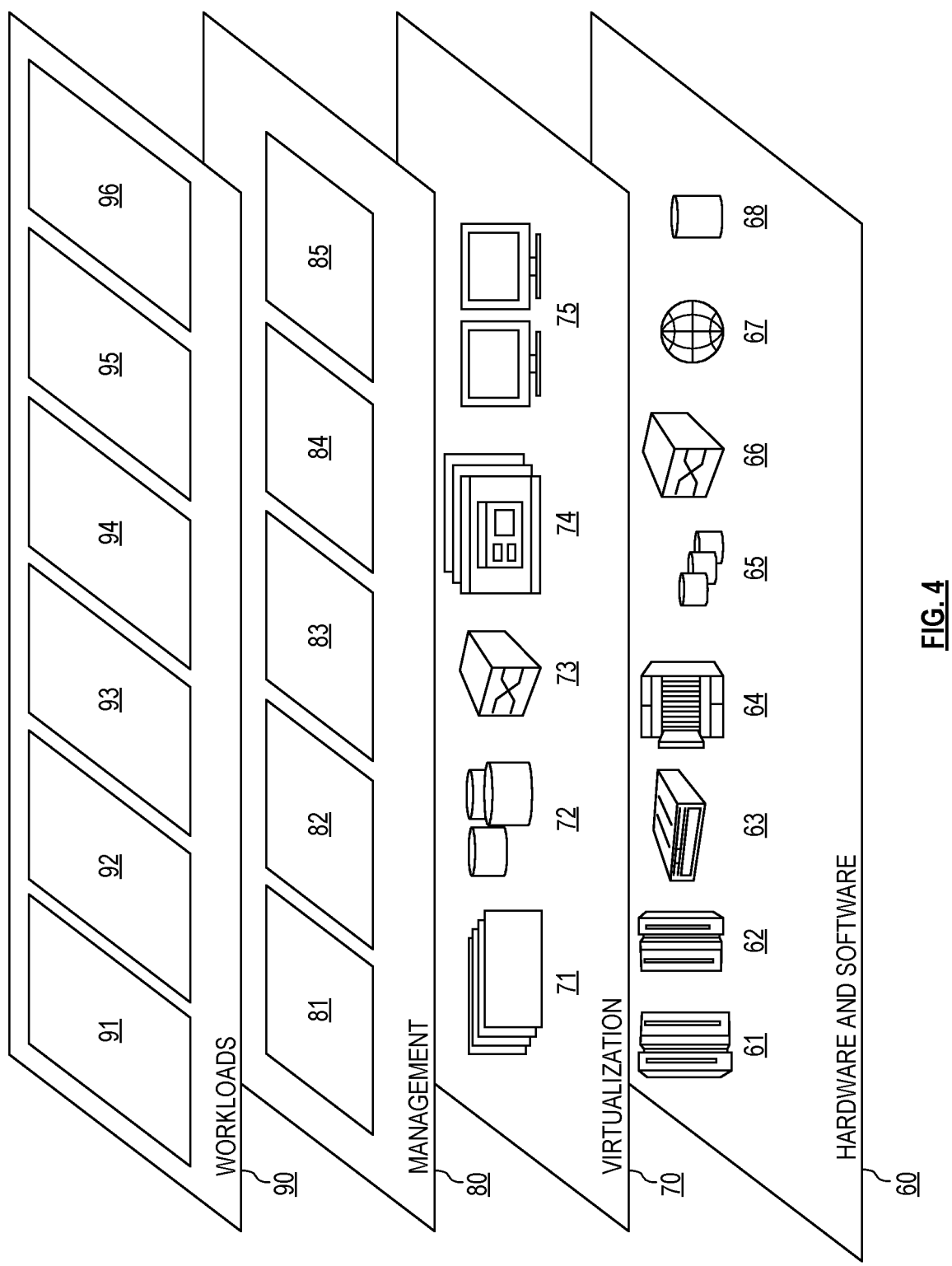
FIG. 4 depicts abstraction model layers according to various embodiments of the present invention.

In some embodiments, network 450 can be implemented by utilizing the cloud computing environment 50 of FIG. 3, for example, by utilizing the cognitive psychology authentication 96 of the workloads layer 90 of FIG. 4 to perform cognitive psychology authentication in the network. The cognitive psychology processing system 470 and/or the cognitive psychology database 490 can be implemented by utilizing one or more nodes 10 of a cloud computing environment 50 of FIG. 3. Some or all server systems 460 can communicate with the cognitive psychology processing system 470, and/or a cognitive psychology database 490 via a corresponding node 10 of a cloud computing environment 50 of FIG. 3. Some or all server systems 460 can be managed by or otherwise communicate with devices 54A-N of FIG. 3, for example, corresponding to servers and/or administrative devices of the service and/or entity associated with the server system 460. Some or all client devices 454 can be implemented by utilizing devices 54A-N of FIG. 3.

Returning to FIG. 14A, client devices 454 are depicted communicating directly with different server systems 460. In other embodiments, cognitive psychology authentication system 400 can include an interface device with which all users access the cognitive psychology authentication system 400 via a wired and/or wireless connection, and the gateway device or other interface device can route access requests and/or other communications between client devices and server systems with which they are communicating. In some embodiments, the client devices can communicate directly with the cognitive psychology processing system 470. FIG. 1A also depicts that server systems 460 do not communicate freely with each other, as their corresponding entities may be distinct, separate entities that do not share servers or data. In other embodiments, some or all server systems can communicate and/or share user account data.

Figure 1B:
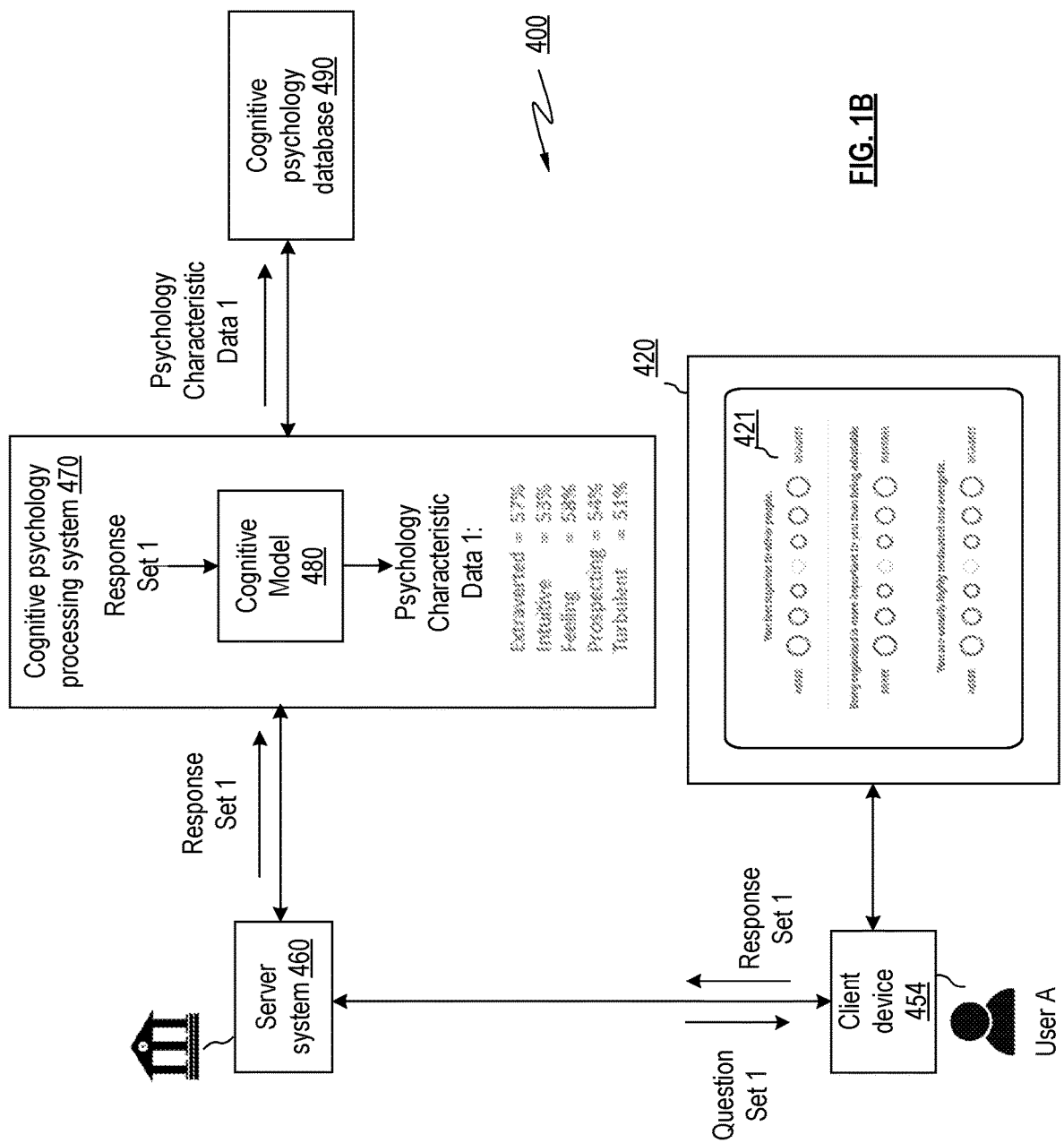

FIG. 1B illustrates how the cognitive psychology authentication system 400 can collect data to build a cognitive psychology profile that reflects a user's psychological characteristics. Consider a secure first time configuration for user A, for example, where user A is creating a new account for one or more services including a banking service. The server system 460 of a banking service can send a set of random, pseudo-random, or predetermined questions or other prompts (from various domains or from a large plurality of questions and/or prompts) to the client device 454 associated with user A during the first-time configuration. These questions can be selected by the server system 460, or can be selected by the cognitive psychology processing system 470 and sent to the server system 460 for transmission to client device 454, or transmitted directly by the cognitive psychology processing system 470 to the client device 454. In various embodiments, the questions and/or prompts can include a self-report questionnaire with the purpose of indicating differing psychological characteristics relating to how people think, act, interact with others, perceive the world around them and/or make decisions. In particular, the questions and/or prompts can include questions with predetermined mappings to personality traits and, for example, can be selected in accordance with a Myers-Briggs Type Indicator, Keirsey temperaments, a Five Factor Model, a dimensions of behavior profile, Hermann Brain Dominance Instrument, and/or other personality tests or psychological profiling techniques representing best industry practices.

The client device 454 can be configured to display the questions or other prompts on a display device 420 via a user interface 421. For example, the display device 420 can be implemented by utilizing the display screen 320 of FIG. 5. The user interface 421 can be displayed in conjunction with a web browser associated with the server system 460 and/or the cognitive psychology processing system 470, and/or can be displayed in conjunction with an application stored in a memory of the client device, where the application is associated with the server system 460 and/or the cognitive psychology processing system 470. The user can respond to each question and/or other prompt by interacting with the user interface, for example, by utilizing keyboard or keypad 322, a computer mouse or touchpad 324, a touchscreen of the display screen 320, a microphone, or other user input devices of the client device 454.

Returning now to FIG. 1B, user A's responses to these questions can be sent to the server system 460 for transmission to the cognitive psychology processing system 470 and/or can be transmitted directly to the cognitive psychology processing system 470. In some embodiments, the question set is selected and sent to the client device 454 all at once, and the response set is sent to the server system 460 and/or the cognitive psychology processing system 470 all at once, once all questions are answered. In other embodiments, questions are sent one at a time and/or a subset of questions is transmitted. Responses to the one question and/or the subset are transmitted back, and subsequent questions are determined by the cognitive psychology processing system 470 for transmission to the client device 454, based on the responses received.

The cognitive psychology processing system 470 can analyze and/or process the response set to assesses the user A's psychological characteristics. For example, the user can respond to the questions and/or prompts with "strongly agree", "agree", "neutral", "disagree", "strongly disagree," etc. In other embodiments, the questions can include yes or no questions where the user responds with "yes" or "no". Any prompt for user input can be considered a "question" as used herein, and any corresponding user response selected from a discrete set of choices, entered as a continuous value, entered as text, entered as image or audio data, and/or entered via other user input can be considered an "answer" as used herein.

The responses collected can be treated as initial record of truth and used as input to cognitive model 480. A cognitive psychology profile can be generated by the cognitive psychology processing system 470 for user A, for example, by utilizing the cognitive model 480. The cognitive psychology profile for user A can be sent to cognitive psychology database 490 and/or stored in local memory, and can be mapped to an identifier corresponding to user A. This cognitive psychology profile can be considered truth data for user A, and can be utilized to authenticate the user in future access attempts to the cognitive psychology authentication system 400, for example, in attempts to access user A's account of the same or different service and/or entity. The cognitive psychology database 490 can store a plurality of cognitive psychology profiles mapped to identifiers of a plurality of users of the system.

In some embodiments, the cognitive psychology profile includes and/or is determined based on a set of scores assigned to each of a plurality of psychological characteristics. The psychological characteristics can include one or more of curiousness, observant-ness, application of experience, conservativeness, energetic-ness, enthusiastic-ness, self-efficacy, adventuristic, emotional quotient, adventurist, extraverted, intuitive, feeling, prospecting, turbulent, communication skills, relaxing techniques, very popular, friendly, practical skills, focus, overthink things, stressed easily, independent to a fault, and/or other personality traits or psychological characteristics. The response set can be fed to the cognitive model 480 as training data, and a decision tree can be spanned to compare the options against a truth table in order to identify the user's psychological characteristics and/or to calculate the set of scores. In some embodiments, the score is a deterministic function of the response. For example, a score for "extroverted" can correspond to the question "Do you consider yourself the life of the party?", and can be a deterministic function of the response, where the response "yes" corresponds to a score of 100% and the response "no" corresponds to a score of 0%. As another example, where a user is prompted to select from "strongly agree", "agree", "neutral", "disagree", and "strongly disagree" to the prompt "You consider yourself the life of the party," "strongly agree" can correspond to an "extroverted" score of 100%, "agree" can correspond to an "extroverted" score of 75%, "neutral" can correspond to an "extroverted" score of 50%, "disagree" can correspond to an "extroverted" score of 25%, and "strongly disagree" can correspond to an "extroverted" score of 0%. In some embodiments, if multiple questions correspond to the same psychological characteristic, an average of the scores can be calculate to determine the user's score for the psychological characteristic. For example, responses to the questions "Would you rather read a book at home or go to a social function?" or "Do you feel like you need to recharge alone after socializing?" could also map to the "extroverted" psychological characteristic. In some embodiments, the questions can be assigned weights, and the average can be calculated as a weighted average of the response scores based on the corresponding question weights. The mapping of questions to psychological characteristics and/or the scoring of the responses can be learned by the cognitive psychology model and/or can be based on a truth table or other known mapping and/or scoring, for example, based on cognitive psychology research.

Figure 1C:
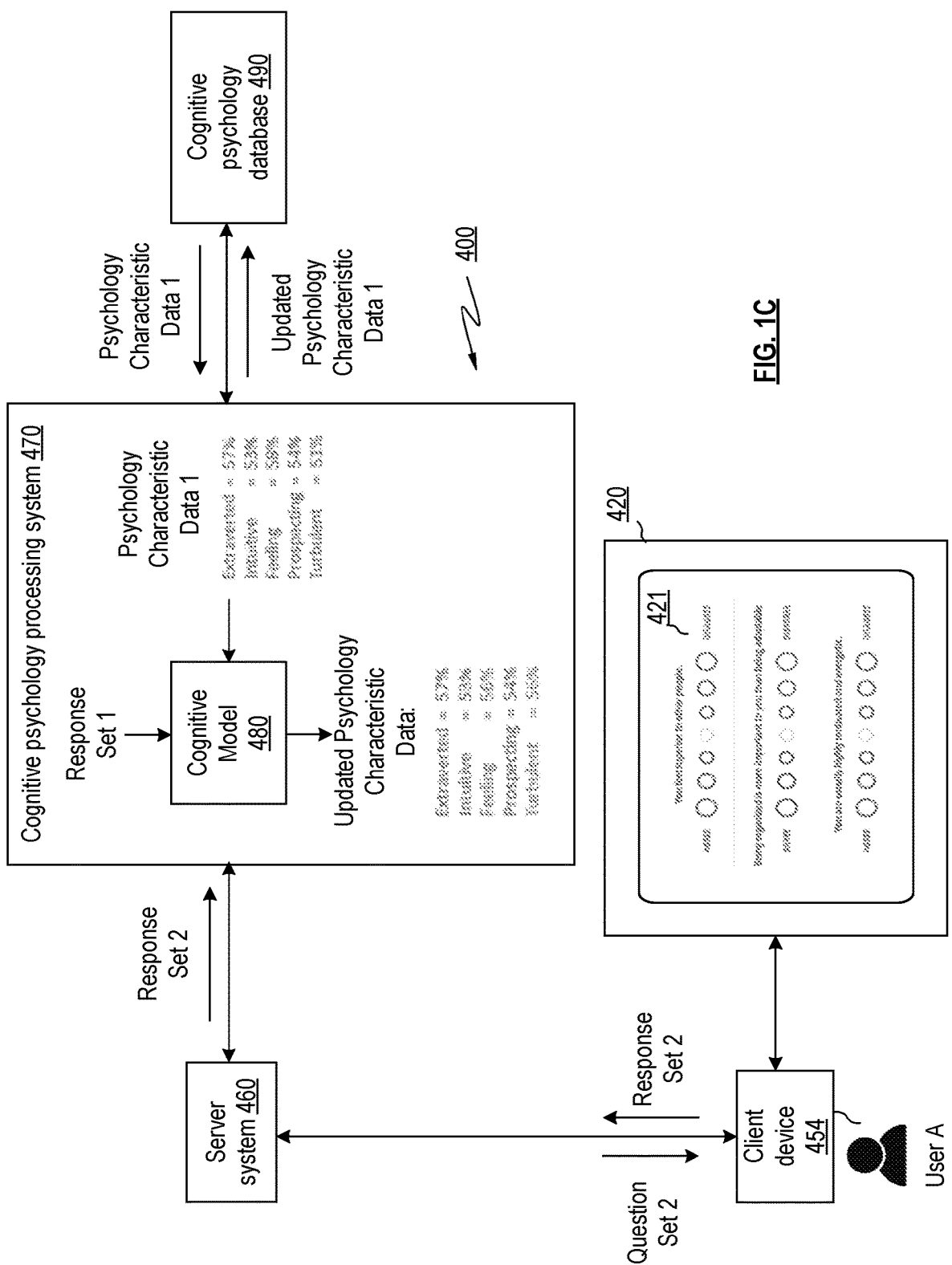

FIG. 1C illustrates how the cognitive psychology authentication system 400 can keep track of the psychological characteristics change of the user over time. The cognitive psychology authentication system can collect subsequent data from users, and can use the subsequently collected data to track changes in one or more psychological characteristics and can update the users' cognitive psychology profiles accordingly. In some embodiments, this subsequently collected data includes subsequent response sets corresponding to subsequent question sets. Users can be periodically asked subsequent questions from the plurality of questions to keep their corresponding cognitive psychology profiles updated to reflect personality or other cognitive psychology changes that differ from that generated based on the initial set of responses. The frequency by which these questions are asked can be configured by the user and/or by the one or more services and/or entities with which the user has an account. The user can respond to the subsequent question sets in the same or different fashion as described with respect to the initial question set as described in conjunction with FIG. 1B, and a response set can be sent to the cognitive psychology processing system 470.

The subsequently collected data gathered over time for one or more users can be used to build and/or maintain the cognitive model 480. The subsequently collected data can be used to generate updated psychology characteristic scores to keep users' cognitive psychology profiles updated to reflect personality or other cognitive psychology changes that differ from that generated based on the initial set of responses. For example, the cognitive model 480 can be utilized to generate an updated cognitive psychology profile for user A, for storage in the cognitive psychology database 490, based on the cognitive psychology profile of the user A retrieved from the database and based on new data collected from the user, such as response sets to subsequent sets of questions.

In various embodiments, in addition to including psychological characteristics scores, each cognitive psychology profile can include personality volatility data that indicates by how much, how frequently, and/or how recently the corresponding user's psychological characteristics scores have changed. A volatility score can be calculated and maintained for each psychological characteristic to indicate this magnitude, frequency, and or recentness of change of each psychological characteristic separately, and/or an overall volatility score can be calculated and maintained to indicate aggregate magnitude, frequency, and or recentness of change over all of the psychological characteristics. For example, calculating the volatility score can include calculating a Euclidian distance between a first vector and a second vector, where the first vector includes the old psychological characteristic scores stored in the cognitive psychology profile of the user, and the second vector includes the newly psychological characteristic scores calculated based on the subsequently collected data.

In some embodiments, the cognitive psychology processing system 470 has access to some or all of the communication channels of one or more client devices 454 and/or assesses and data collected by some or all services and/or entities. In such embodiments, the subsequently collected data used by the cognitive psychology processing system to track psychological characteristics change of the user over time and keep cognitive psychology profiles updated includes data collected from the communication channels and/or user accounts. Users can be prompted, for example, via user interface 421, to select whether or not the cognitive psychology authentication system 400 is allowed to access and utilize some or all communication channels of one or more of their client devices 454, input devices of one or more of their client devices 454, and/or data stored on of one or more of their client devices 454. Alternatively or in addition, users can be prompted, to select whether or not the cognitive psychology authentication system 400 is allowed to access and utilize some or all user accounts of the one or more entities and/or services. The access per channel and/or account can be configurable and controllable by the user and/or by server systems 460.

In such embodiments, the cognitive psychology processing system 470 can utilize various parsing models to process incoming and/or outgoing content via configured communication channels and/or data collected by or stored on of one or more client devices 454 associated with a user. For example, the cognitive psychology model can utilize input data to the client device or other data collected by the client device, such as text input, voice input, camera input, location data, movement data, usage habits, or other information. The cognitive psychology model can utilize text processing, audio processing, and/or natural language processing on text input and/or voice input, utilizing computer vision processing on camera input, and/or utilize other learning models to determine scores for one or more psychological characteristics based on this collected information. Alternatively or in addition, the cognitive psychology model can utilize various parsing models to process data associated with one or more user accounts of the cognitive psychology authentication system 400, such as accounts with one or more services or other entities stored on or accessed by server systems 460. For example, if a server system 460 correspond to a social media service, the cognitive psychology model can monitor social media behavior of users, for example, utilizing natural language processing on user social media posts and/or comments, utilizing computer vision processing on photos posted by the user and/or that include the user, and/or to process other social media activity by the user. In various embodiments, input data can be collected by one or more parser models of the cognitive psychology processing system that is related to psychological characteristics based on the user's responses to various issues, and/or can contain a model which helps measure the third person effect. Influencers can be subordinates, colleagues, managers, fictitious characteristics liked by the user, etc.

The cognitive model 480, parser models, and/or other learning models can be utilized to identify psychological characteristics and/or to generate a set of psychological characteristic scores. Based on the psychological characteristics identified, a weighted priority of changes per psychological characteristic can be calculated. For example, this weighted priority can be based on if the psychological characteristics change is identified initially via one channel, and is the same characteristic change is identified a threshold number of subsequent times across same and/or in threshold number of different channel, and accordingly modified percentages are calculated and stored. The cognitive model 480 can be utilized to generate an updated cognitive psychology profile for user A, for storage in the cognitive psychology database 490, based on the cognitive psychology profile of the user A retrieved from the database and based the identified psychological characteristics determined by utilizing the data collected from the communication channels and/or user accounts. In some embodiments, the data collected from the communication channels and/or user account can be used by the cognitive psychology processing system 470 to create the initial cognitive psychology profile, for example, instead of or addition to utilizing the set of response from the set of questions.

Figure 1D:
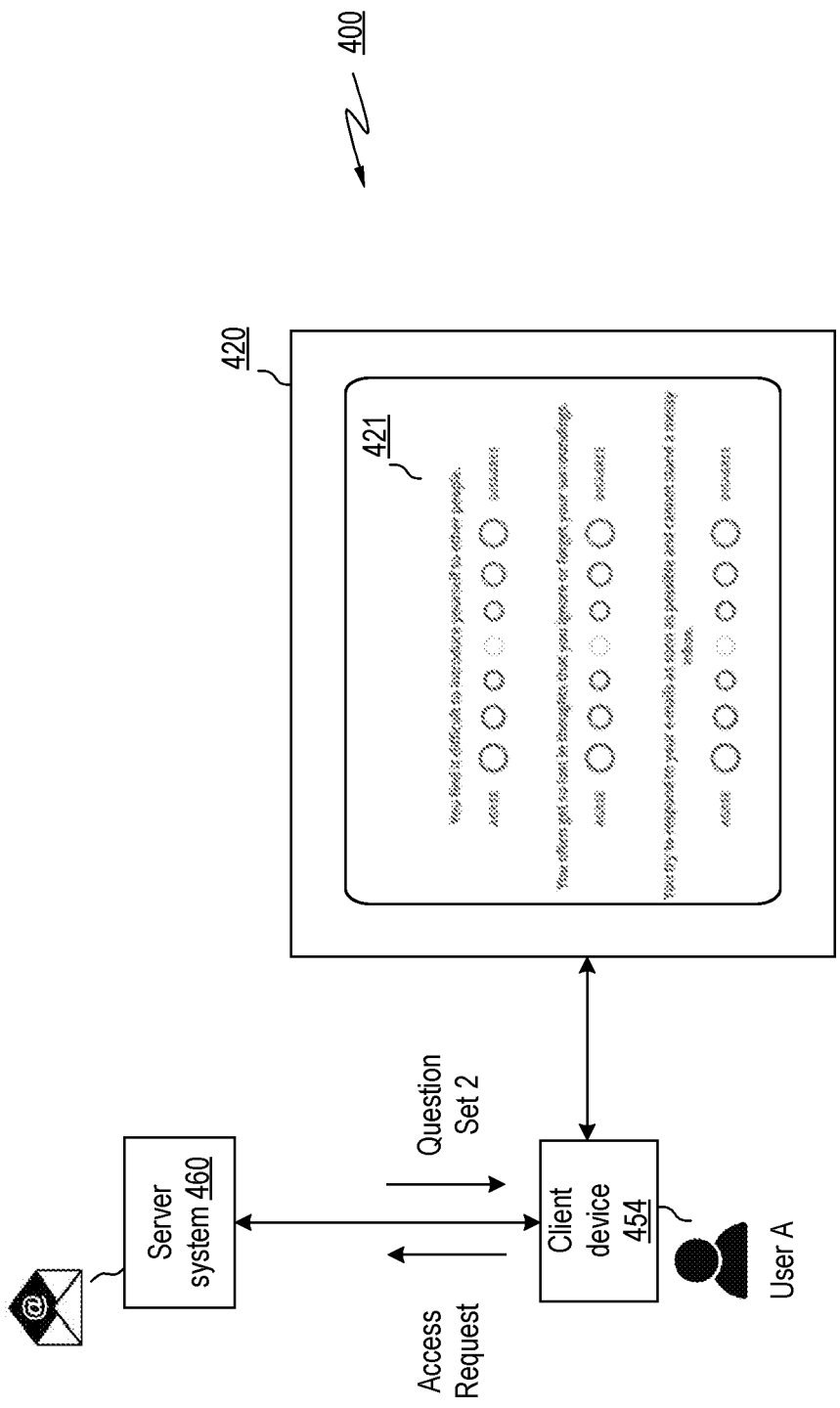
Figure 1E:
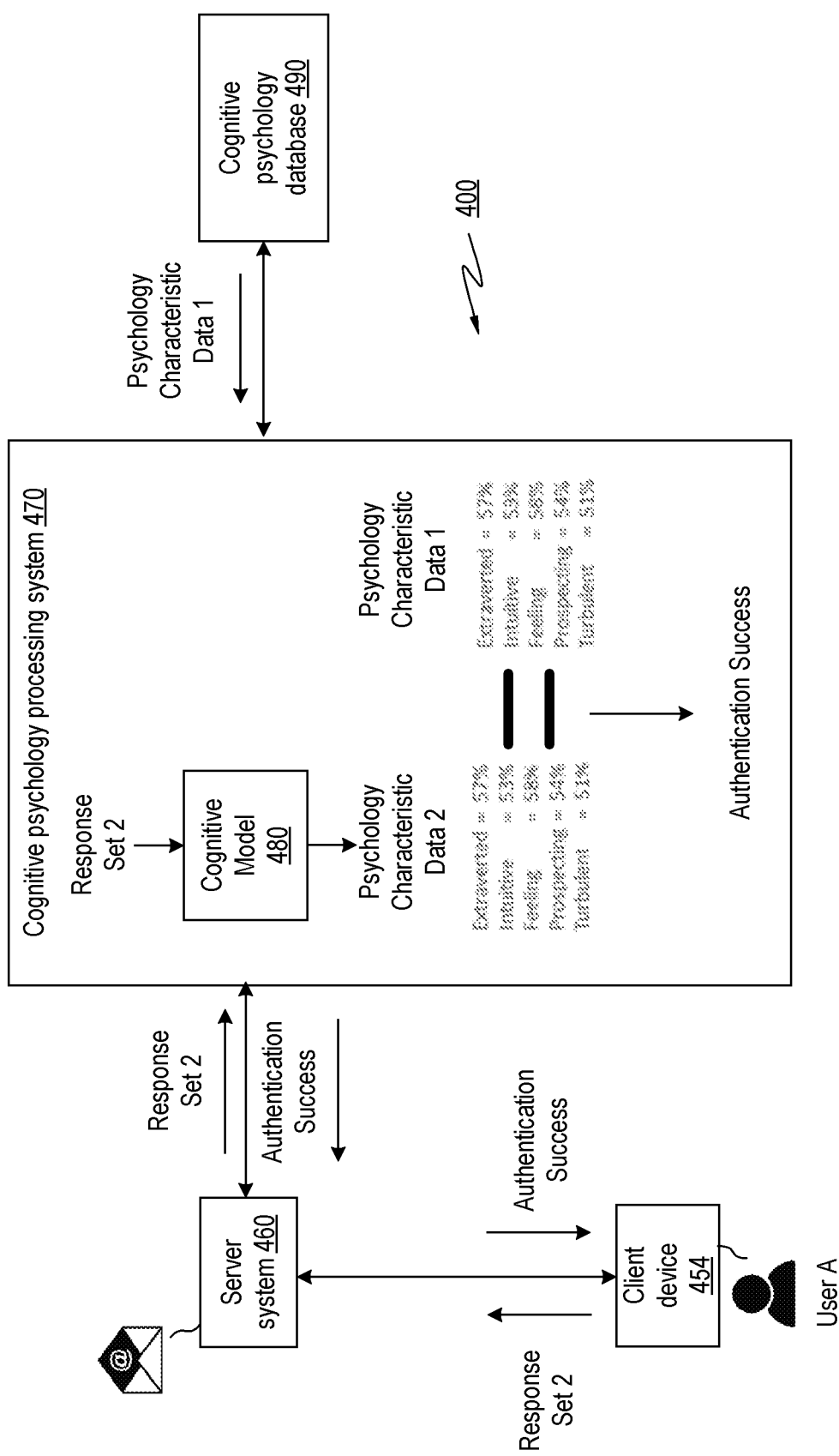
Figure 1F:
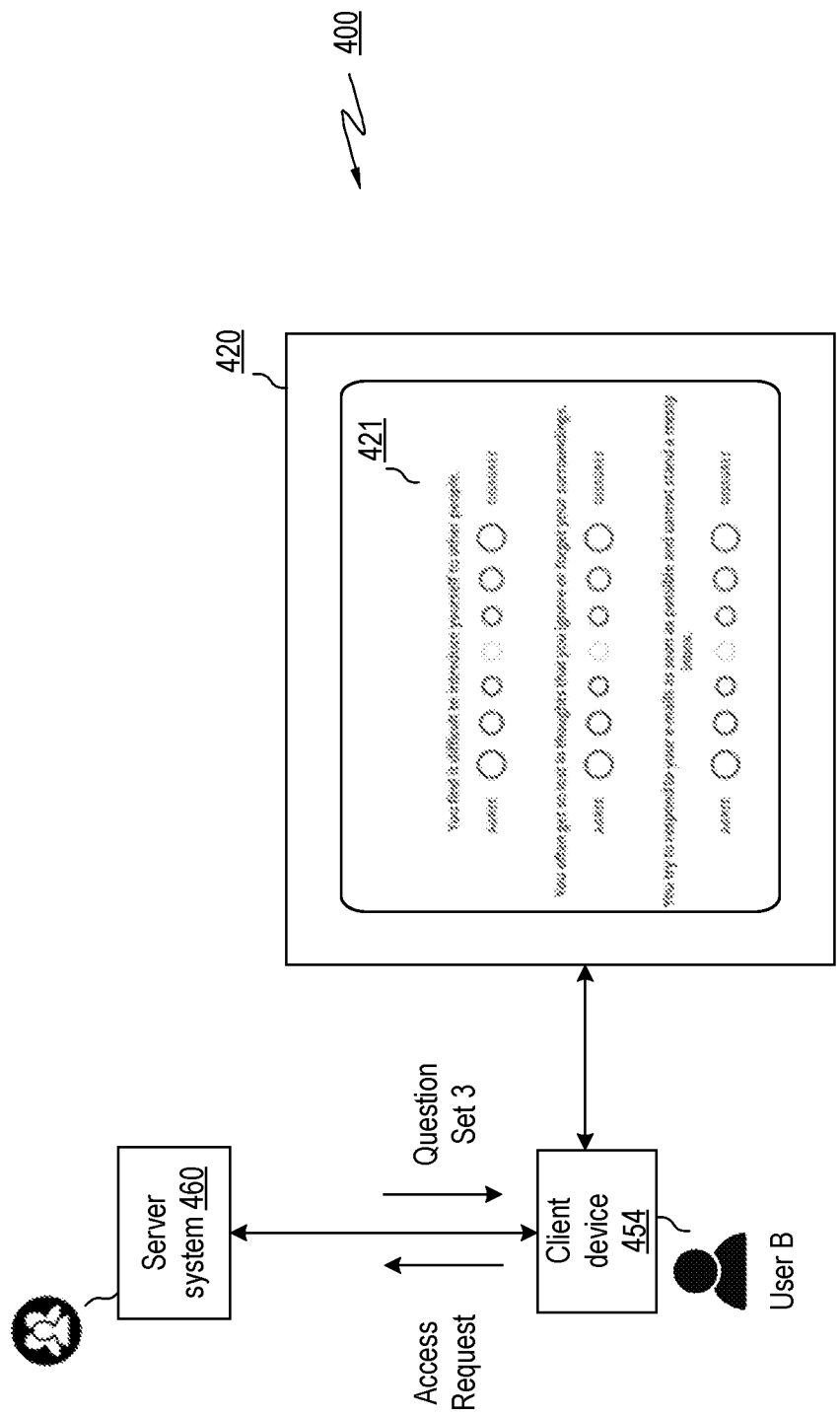
Figure 1G:
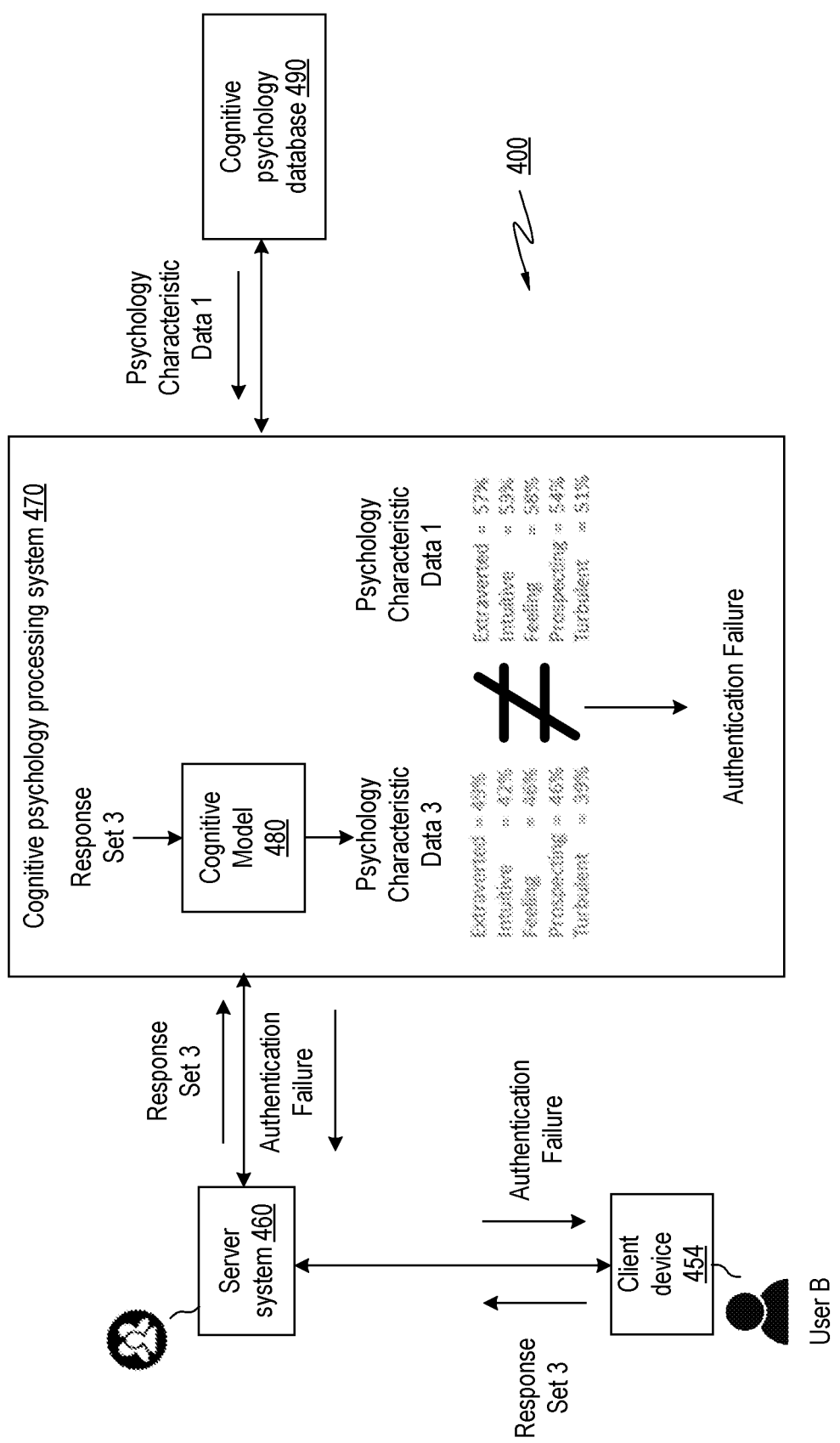

FIGS. 1D-1G illustrate how authentication can be performed by the cognitive psychology processing system 470. FIGS. 1D-1E illustrate an example where authentication is performed for an access attempt made by user A to access a secure resource, such as their own account information or other secure resource, where authentication is successful. FIGS. 1F-1G illustrate an example where authentication is performed regarding a request to access a secure resource where authentication fails. In the example shown, an attempt to access user A's account is made by a different user B. Authentication can be determined to be necessary in subsequent access attempts by a user, for example, determined by a server system 460 and/or by the cognitive psychology processing system 470. This determination can be triggered, for example, when a user is performing a spurious and/or high-volume transaction, and/or when an attempt to access a user account is made on a device that is not known to be associated with the user. Such subsequent access attempts that trigger authentication can be made to the same or different account as the account accessed in the initial setup process of FIG. 1B. For example, as depicted in FIG. 1D, user A attempts to access their email account and sends an access request to the server system 460 associated with providing the email service, and in FIG. 1F, user B attempts to access the social media account of user A and sends an access request to the server system 460 associated with providing the social media service.

When multi-factor authentication is determined to be necessary, a set of random, pseudo-random, and/or predetermined questions can be selected from the plurality of questions for transmission to the client device of the user. These questions could be entirely different than the ones that are asked during the initial setup, and/or some or all questions can be repeated. The user can answer the questions by interacting with the user interface presented on the display device 420 of the same or different client device 454 as described with respect to the initial setup described in conjunction with FIG. 1B. These response sets can be transmitted to the server system 460 and/or to the cognitive psychology processing system 470 directly.

As shown in FIGS. 1E and 1G, based on the responses provided, the cognitive psychology processing system 470 can utilize the cognitive model 480 to calculate and/or otherwise assesses the psychological characteristics of the current user, for example, by generating scores for some or all of the plurality of psychological characteristics based on this set of responses. The cognitive psychology processing system 470 can perform quantitative comparisons of these psychological characteristic scores to the cognitive psychology profile of the user to authenticate the user. For example, if the assessment result is equal, close to, or otherwise compares favorably to the assessment stored in the cognitive psychology profile of the user, authentication is successful, as illustrated in FIG. 1E. The spurious and/or high-volume transaction is performed and/or the user is granted the requested access. Otherwise, if the assessment result compares unfavorably to the assessment stored in the cognitive psychology profile of the user, authentication fails, as illustrated in FIG. 1G. The spurious and/or high-volume transaction is not performed and/or the user is denied the requested access. If authentication is successful, in some embodiments, the new set of responses can be included in the subsequently collected data as described in the discussion of FIG. 1C, and can be used to update the cognitive psychology profile, for example, by replacing the stored scores with the new scores and/or by averaging the stored scores with the new scores.

Quantitatively comparing assessed psychological characteristics by a user of an access attempt to assessed psychological characteristics of a cognitive psychology profile can be based on calculating an authentication score and comparing the authentication score to an authentication threshold, such as a likelihood threshold that is based on the particular psychological model or model employed. For example, the authentication score can be calculated by calculating a Euclidian distance between a first vector and a second vector, where the first vector includes the psychological characteristic scores stored in the cognitive psychology profile of the user, and the second vector includes the psychological characteristic scores calculated based on the received responses in the multi-factor authentication. In various embodiments, the authentication threshold can be fixed. In some embodiments, the authentication threshold is set by each entity, the particular secure resource to be accessed, a level of trust in a particular user and/or the particular service, and the authentication threshold corresponding to the entity, user, secure resource and/or service to which assess is requested will be used. In some embodiments, the authentication threshold can be further determined based on a determined level of spuriousness and/or level of high-volume of the requested transaction. For example, a spuriousness score and/or a high-volume score can be calculated for the requested transaction, based on user access history and/or based on the transaction request itself. The authentication threshold can be set based on the spuriousness score and/or the high-volume score, for example, where a more spurious transaction requires that the assessed psychological characteristics compare more closely to the stored psychological characteristics of the user. In some embodiments, the authentication threshold is calculated based on the determined magnitude, determined frequency, and or determined recentness of change in the user's psychological characteristics, for example, by utilizing the volatility score of the cognitive psychology profile. For example, if the volatility score indicates that a first user has exhibited several large and/or recent psychological characteristic changes, the authentication threshold can require that the assessed psychological characteristics compare less closely to the stored psychological characteristics of the first user, while the authentication threshold can require that the assessed psychological characteristics compare more closely for a second user with a volatility score that indicates that the second user has exhibited only very few and/or minor psychological characteristic changes.

In some embodiments, the cognitive psychology profile includes and/or comprises only a hash value. For example, after the set of scores is calculated, a hash function or other one-way function can be performed on the set of scores and/or can otherwise be calculated based on the set of responses and/or other subsequently collected data. This can be utilized to keep users' cognitive psychology data private. The hash value stored in the cognitive psychology profile can be compared to a hash value generated in response to receiving a set of responses as part of an authentication, where authentication is granted when the hash values match.

The cognitive model 480 can be the same or different for each user, based on training data and subsequent data received over time. For example, the cognitive psychology profile can include parameters, function coefficients, training data, model function type, and/or other data specific to the corresponding user, and the cognitive psychology processing system 470, after fetching a user's cognitive psychology profile, can perform an algorithm on the received response data by utilizing the parameters, function coefficients, training data, and/or model type of the cognitive psychology profile. In other embodiments, the cognitive model 480 can be used or shared across various users, and the model can utilize methods such as conceptual theory improvements, cognitive maintaining cycle, method of perfectionism, or other similar methods.

In some embodiments, the cognitive psychology processing system 470 can utilize the cognitive model 480 and/or another model for question selection when selecting the initial set of questions and/or subsequent sets of questions for authentications and/or cognitive psychology profile updates. The cognitive psychology processing system 470 can use the training data to determine how to select the question set from the plurality of questions for a user in the multi-factor authentication process in subsequent access attempts and/or to receive more specific and/or updated cognitive psychology profile information for the user. For example, the cognitive model 480 can learn and improve over time in question selection for users, improving upon selecting which questions are asked, the number of questions that are asked, the order in which the questions need to be asked, and/or how many questions are repeated from previous question sets. In some embodiments, the cognitive psychology processing system 470 selects the set of questions, number of questions in the set, ordering of questions in the set, and/or number of repeated questions from previous question sets based on user's recent psychological characteristic changes, for example, by utilizing the personality volatility data of the cognitive psychology profile. For example, a higher number of questions may be selected in response to determining the user's personality has greatly changed recently, and/or a higher proportion of questions related to extroverted-ness are selected in response to determining the psychological characteristic score for extroverted-ness has greatly changed recently. In some embodiments, when performing an authentication in response to a transaction request, the cognitive psychology processing system 470 selects the set of questions, number of questions in the set, ordering of questions in the set, and/or number of repeated questions from previous question sets based on the spuriousness and/or the how high volume the requested transaction is, for example, by utilizing the spuriousness score and/or high-volume score. For example, a greater number of questions can be determined to be required to authenticate more spurious and/or high-volume transactions.

In some embodiments, a cognitive psychology processing system 470 is integrated within a client device 454 or other client device, for example, as part of a local security system for the client device itself. For example, to unlock or sign-in to sensitive applications stored on a mobile device, to access sensitive files stored on a computer, and/or to unlock and use a mobile device, a user must answer a set of questions for comparison to their cognitive psychology profile stored on the client device. In such embodiments, the client device 454 can perform authentication as described herein even when disconnected from the network 450. The cognitive psychology processing system 470 can be implemented by utilizing memory and/or processors of the client device 454 itself. In some embodiments, the cognitive psychology processing system 470 stored on the client device 454 receives the cognitive psychology profile of the user from the separate cognitive psychology database 490, where generated cognitive psychology profile is generated as depicted in FIG. 1B in conjunction with creating one or more user accounts of service and/or entity associated with a server system 460. In other embodiments, the cognitive psychology profile is generated by the cognitive psychology processing system 470 stored on the client device 454 based on processing data collected by the client device as descried herein and/or by presenting an initial set of questions to the user on the display device 420 of the client device as described herein.

In various embodiments, a cognitive psychology processing system includes at least one processor and a memory that stores operational instructions. The operational instructions, when executed by the at least one processor, cause the psychology processing system to receive a request to access a first account associated with a first user. A set of cognitive psychology questions are selected from a plurality of cognitive psychology questions for transmission to a first client device associated with the request for display on a display device of the first client device via a user interface displayed on the display device. A set of responses corresponding to the set of cognitive psychology questions are received, where the set of responses is generated by the first client device based on input to the user interface received via an input device of the first client device. Cognitive psychology data is generated based on the set of responses, and a cognitive psychology profile associated with the first user is retrieved from a database. An authentication score is calculated based on comparing the cognitive psychology data to the cognitive psychology profile. An authentication success notification is transmitted when the authentication score compares favorably to an authentication threshold. An authentication failure notification is transmitted when the authentication score compares unfavorably to the authentication threshold.

In addition or alternative to indicating authentication success or failure, the cognitive psychology processing system 470 and/or server system 460 can take additional actions in response to the authentication success or failure. For example, the cognitive psychology processing system 470 and/or server system 460 can take additional action(s) to provide or grant access by the client device 454 to the secure resource in response to authentication success. Furthermore, the cognitive psychology processing system 470 and/or server system 460 can take additional action(s) to prevent or deny access by the client device to the secure resource in response to authentication failure. In circumstances where the secure resource is a data file, the cognitive psychology processing system 470 and/or server system 460 can take additional action(s) to transmit all or part of the data file to the client device 454 in response to successful authentication.

While FIGS. 1D-1G have presented communication flows whereby the cognitive psychology processing system 470 communicates with the client device 454 via the server system 460, other configurations are possible. For example, the cognitive psychology processing system 470 can operate similarly to an authentication server and receive a pass-off from the server system 460 in order to handle authentication communications with the client device 454 without requiring the server system 460. When the authentication process is completed, the cognitive psychology processing system 470 can pass-back the communications with the client device 454 to the server system 460 along with a cookie, token or other indication that the authentication either succeeded or failed. Furthermore, as previously discussed, while the cognitive psychology processing system 470 is shown as being separate from the server system 460, in other configurations the cognitive psychology processing system 470 can be included as a component of the server system 460.

Figure 2:
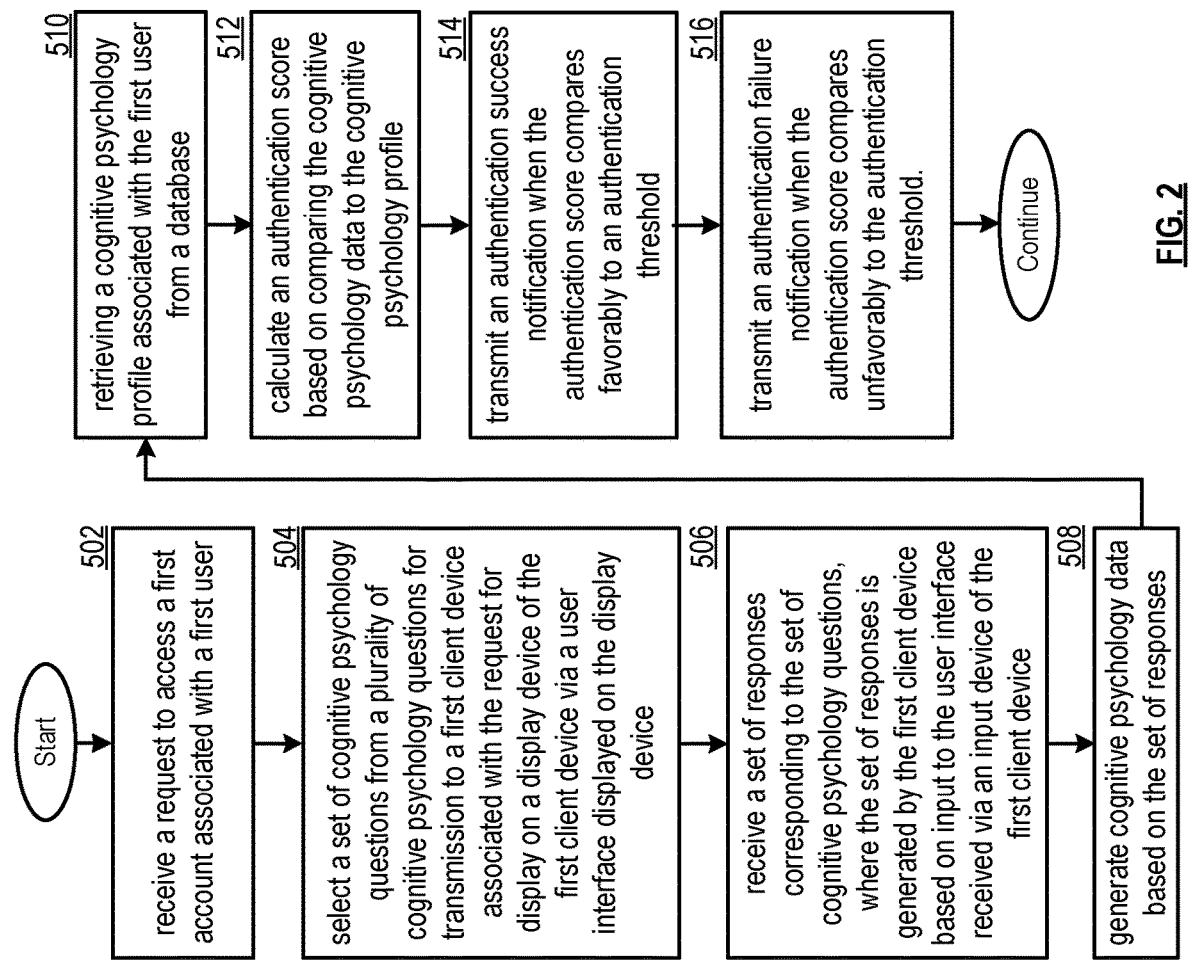
FIG. 2 is a logic diagram of an example of a method of performing cognitive psychology authentication in accordance with the present invention.

FIG. 2 is a logic diagram of an example of a method of performing cognitive psychology authentication. In particular, a method is presented for use in association with one or more functions and features described in conjunction with FIGS. 1A-1G, for execution by a cognitive psychology processing system that includes a processor, or via another device and/or system of a cognitive psychology authentication system, that includes at least one processor and memory that stores instruction that configure the processor or processors to perform the steps described below.

Step 502 includes receiving a request to access a first account associated with a first user. Step 504 includes selecting a set of cognitive psychology questions from a plurality of cognitive psychology questions for transmission to a first client device associated with the request for display on a display device of the first client device via a user interface displayed on the display device. Step 506 includes receiving a set of responses corresponding to the set of cognitive psychology questions, where the set of responses is generated by the first client device based on input to the user interface received via an input device of the first client device. Step 508 includes generating cognitive psychology data based on the set of responses. Step 510 includes retrieving a cognitive psychology profile associated with the first user from a database. Step 512 includes calculating an authentication score based on comparing the cognitive psychology data to the cognitive psychology profile. Step 514 includes transmitting an authentication success notification when the authentication score compares favorably to an authentication threshold. Step 516 includes transmitting an authentication failure notification when the authentication score compares unfavorably to the authentication threshold.

In various embodiments, generating the cognitive psychology data includes calculating a first set of scores corresponding to a plurality of cognitive psychology characteristics. The cognitive psychology profile includes a second set of scores corresponding to the plurality of cognitive psychology characteristics, and calculating the authentication score includes comparing the first set of scores to the second set of scores. In various embodiments, the authentication score indicates that at least one of the first set of scores is different from a corresponding at least one of the second set of scores, and the authentication score compares favorably to the authentication threshold. In various embodiments, calculating the authentication score includes calculating a Euclidean distance between a first vector and a second vector. The first vector includes the first set of scores, and the second vector includes the second set of scores. In various embodiments, generating the cognitive psychology data includes calculating a first set of scores corresponding to a plurality of cognitive psychology characteristics and further includes calculating a first hash value by performing a hash function on the first set of scores. The cognitive psychology profile includes a second hash value, and calculating the authentication score includes comparing the first hash value and the second hash value.

In various embodiments, an updated cognitive psychology profile is generated based on the cognitive psychology data. The updated cognitive psychology profile is mapped to an identifier associated with the first user in the database. In various embodiments, subsequently collected data associated with the first user is received. Second cognitive psychology data is generated based on the subsequently collected data. An updated cognitive psychology profile is generated based on the second cognitive psychology data. The updated cognitive psychology profile is mapped to an identifier associated with the first user in the database. In various embodiments, the subsequently collected data includes image data collected by a camera of the first client device wherein the subsequently collected data is received from the first client device, and the second cognitive psychology data is generated by utilizing a computer vision model. In various embodiments, the first account includes a social media account. The subsequently collected data includes social media data received from a server system that stores the social media account, and the second cognitive psychology data is generated based on the social media data. In various embodiments, the cognitive psychology profile associated with the first user is retrieved from the database. Volatility data is generated based on comparing the second cognitive psychology data to the cognitive psychology profile. The volatility data is mapped to the identifier associated with the first user in the database, and the authentication threshold is calculated by performing a function on the volatility data.

In various embodiments, an initial set of cognitive psychology questions are selected from the plurality of cognitive psychology questions for transmission to a second client device associated with a request to initialize the first account for the first user. Selecting the set of cognitive psychology questions includes selecting cognitive psychology questions from the plurality of cognitive psychology questions not included in the initial set of cognitive psychology questions. An initial set of responses corresponding to the initial set of cognitive psychology questions. The cognitive psychology profile based on the initial set of responses and the cognitive psychology profile is mapped to an identifier associated with the first user in the database. In various embodiments, a spuriousness score is calculated based on the request, and the authentication threshold is calculated by performing a function on the spuriousness score.

FIG. 3 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, a set of functional abstraction layers provided by cloud computing environment 50 of FIG. 3 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, one or more hardware components can be implemented by utilizing the computing device 300 of FIG. 5.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive psychology authentication 96.

Figure 5:
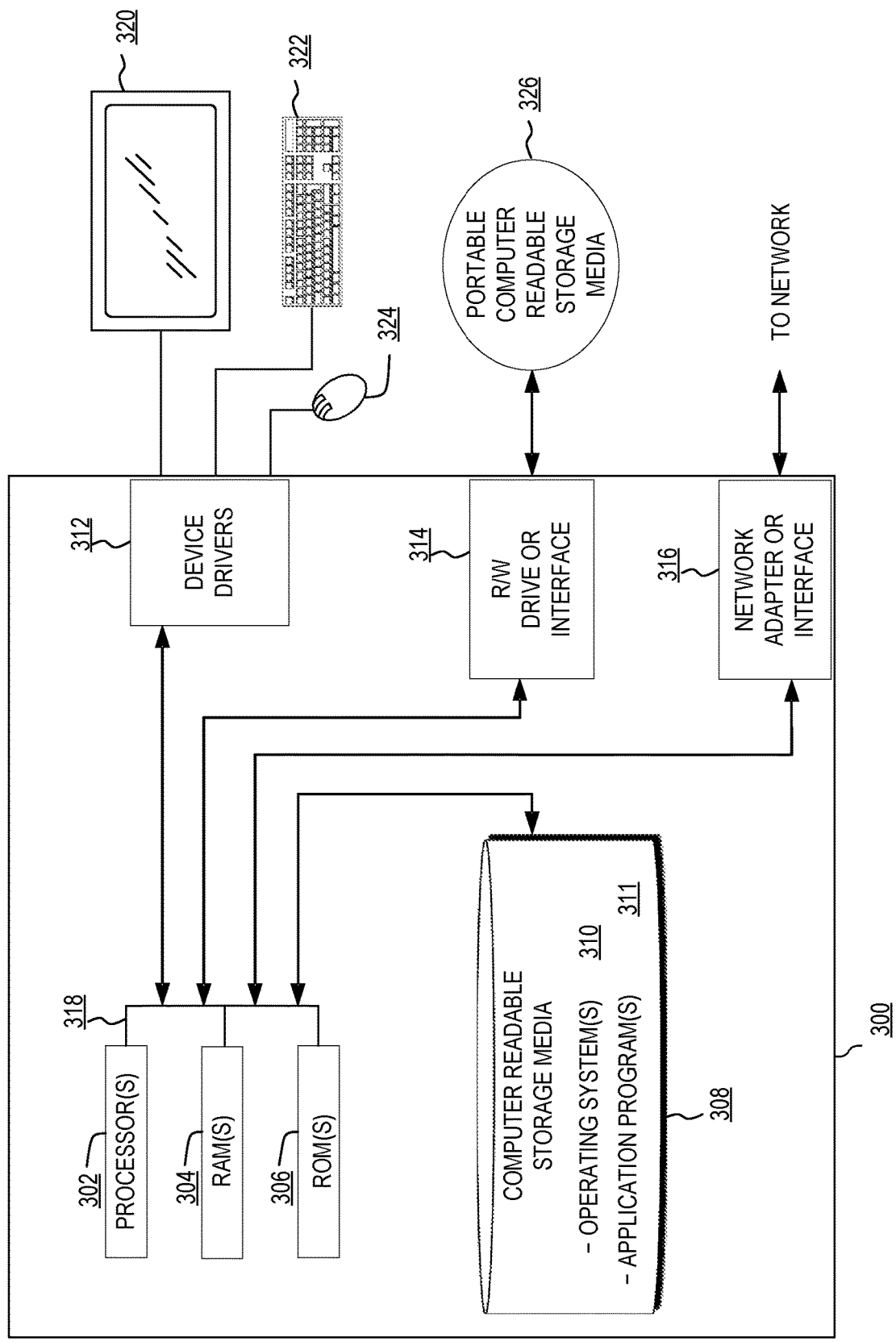
FIG. 5 depicts a block diagram of a computing device according to various embodiments of the present invention.

FIG. 5 depicts a block diagram of components of a computing device 300, which can be utilized to implement some or all of the cloud computing nodes 10, some or all of the computing devices 54A-N of FIG. 3, and/or to implement other computing devices described herein in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 300 can include one or more processors 302, one or more computer-readable RAMs 304, one or more computer-readable ROMs 306, one or more computer readable storage media 308, device drivers 312, read/write drive or interface 314, and network adapter or interface 316, all interconnected over a communications fabric 318. Communications fabric 318 can be implemented with any architecture designed for passing data and/or control information between processors (such as microprocessors, communications and network processors, etc.), system memory, peripheral devices, and any other hardware components within the system.

One or more operating systems 310 and/or application programs 311, such as network application server software 67 and database software 68, are stored on one or more of the computer readable storage media 308 for execution by one or more of the processors 302 via one or more of the respective RAMs 304 (which typically include cache memory). In the illustrated embodiment, each of the computer readable storage media 308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 300 can also include a R/W drive or interface 314 to read from and write to one or more portable computer readable storage media 326. Application programs 311 on computing devices 300 can be stored on one or more of the portable computer readable storage media 326, read via the respective R/W drive or interface 314 and loaded into the respective computer readable storage media 308.

Computing device 300 can also include a network adapter or interface 316, such as a TCP/IP adapter card or wireless communication adapter. Application programs 311 on computing devices 54A-N can be downloaded to the computing device from an external computer or external storage device via a network (for example, the Internet, a local area network or other wide area networks or wireless networks) and network adapter or interface 316. From the network adapter or interface 316, the programs may be loaded into the computer readable storage media 308. The network may comprise copper wires, optical fibers, wireless transmission, routers, firewalls, switches, gateway computers and edge servers.

Computing device 300 can also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314, and network adapter or interface 316 can comprise hardware and software stored in computer readable storage media 308 and/or ROM 306.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a cognitive psychology processing system that includes a processor, the method comprises:
   receiving a request to access a secure resource by a first user;
   calculating a spuriousness score, based on the request, that indicates a level of spuriousness of the request;
   selecting a set of cognitive psychology questions from a plurality of cognitive psychology questions for transmission to a first client device associated with the request for display on a display device of the first client device via a user interface displayed on the display device;
   receiving a set of responses corresponding to the set of cognitive psychology questions, wherein the set of responses is generated by the first client device based on input to the user interface received via an input device of the first client device;
   generating cognitive psychology data based on the set of responses;
   retrieving a cognitive psychology profile associated with the first user from a database;
   calculating an authentication score based on comparing the cognitive psychology data to the cognitive psychology profile;
   calculating an authentication threshold by performing a function on the spuriousness score, wherein the authentication threshold is associated with a high level of spuriousness of the request, and wherein the authentication threshold corresponds to a match between the cognitive psychology data and the cognitive psychology profile for authentication success;
   transmitting an authentication success notification when the authentication score is greater than the authentication threshold; and
   transmitting an authentication failure notification when the authentication score is less than the authentication threshold.

2. The method of claim 1, wherein generating the cognitive psychology data includes calculating a first set of scores corresponding to a plurality of cognitive psychology characteristics, wherein the cognitive psychology profile includes a second set of scores corresponding to the plurality of cognitive psychology characteristics, and wherein calculating the authentication score includes comparing the first set of scores to the second set of scores.

3. The method of claim 2, wherein the authentication score indicates that at least one of the first set of scores is different from a corresponding at least one of the second set of scores, and wherein the authentication score is greater than the authentication threshold.

4. The method of claim 2, wherein calculating the authentication score includes calculating a Euclidean distance between a first vector and a second vector, wherein the first vector includes the first set of scores, and wherein the second vector includes the second set of scores.

5. The method of claim 1, wherein generating the cognitive psychology data includes calculating a first set of scores corresponding to a plurality of cognitive psychology characteristics and further includes calculating a first hash value by performing a hash function on the first set of scores, wherein the cognitive psychology profile includes a second hash value, and wherein calculating the authentication score includes comparing the first hash value and the second hash value.

6. The method of claim 1, further comprising:
   generating an updated cognitive psychology profile based on the cognitive psychology data; and
   mapping the updated cognitive psychology profile to an identifier associated with the first user in the database.

7. The method of claim 1, further comprising:
   receiving subsequently collected data associated with the first user;
   generating second cognitive psychology data based on the subsequently collected data;
   generating an updated cognitive psychology profile based on the second cognitive psychology data; and
   mapping the updated cognitive psychology profile to an identifier associated with the first user in the database.

8. The method of claim 7, wherein the subsequently collected data includes image data collected by a camera of the first client device wherein the subsequently collected data is received from the first client device, and wherein the second cognitive psychology data is generated by utilizing a computer vision model.

9. The method of claim 7, wherein the secure resource includes a social media account, wherein the subsequently collected data includes social media data, wherein the social media data is received from a server system that stores the social media account, and wherein the second cognitive psychology data is generated based on the social media data.

10. The method of claim 7, further comprising:
    retrieving the cognitive psychology profile associated with the first user from the database;
    generating volatility data based on comparing the second cognitive psychology data to the cognitive psychology profile;
    mapping the volatility data to the identifier associated with the first user in the database; and
    calculating the authentication threshold further based on the volatility data.

11. The method of claim 1, further comprising:
    selecting an initial set of cognitive psychology questions from the plurality of cognitive psychology questions for transmission to a second client device associated with a request to initialize an account for the first user;
    receiving an initial set of responses corresponding to the initial set of cognitive psychology questions;
    generating the cognitive psychology profile based on the initial set of responses; and
    mapping the cognitive psychology profile to an identifier associated with the first user in the database;
    wherein selecting the set of cognitive psychology questions includes selecting cognitive psychology questions from the plurality of cognitive psychology questions not included in the initial set of cognitive psychology questions.

12. A cognitive psychology processing system comprises:
    at least one processor;
    a memory that stores operational instructions that, when executed by the at least one processor, cause the cognitive psychology processing system to:
    receive a request to access a first secure resource by a first user;
    calculate a spuriousness score, based on the request, that indicates a level of spuriousness of the request;

select a set of cognitive psychology questions from a plurality of cognitive psychology questions for transmission to a first client device associated with the request for display on a display device of the first client device via a user interface displayed on the display device;

receive a set of responses corresponding to the set of cognitive psychology questions, wherein the set of responses is generated by the first client device based on input to the user interface received via an input device of the first client device;

generate cognitive psychology data based on the set of responses;

retrieve a cognitive psychology profile associated with the first user from a database;

calculate an authentication score based on comparing the cognitive psychology data to the cognitive psychology profile;

calculate an authentication threshold by performing a function on the spuriousness score, wherein the authentication threshold is associated with a high level of spuriousness of the request, and wherein the authentication threshold corresponds to a match between the cognitive psychology data and the cognitive psychology profile for authentication success;

transmit an authentication success notification when the authentication score is greater than the authentication threshold; and transmit an authentication failure notification when the authentication score is less than the authentication threshold.

13. The cognitive psychology processing system of claim 12, wherein generating the cognitive psychology data includes calculating a first set of scores corresponding to a plurality of cognitive psychology characteristics, wherein the cognitive psychology profile includes a second set of scores corresponding to the plurality of cognitive psychology characteristics, and wherein calculating the authentication score includes comparing the first set of scores to the second set of scores.

14. The cognitive psychology processing system of claim 12, wherein the operational instructions, when executed by the at least one processor, further cause the cognitive psychology processing system to:
generate an updated cognitive psychology profile based on the cognitive psychology data; and
map the updated cognitive psychology profile to an identifier associated with the first user in the database.

15. The cognitive psychology processing system of claim 12, wherein the operational instructions, when executed by the at least one processor, further cause the cognitive psychology processing system to:
receive subsequently collected data associated with the first user;
generate second cognitive psychology data based on the subsequently collected data;
generate an updated cognitive psychology profile based on the second cognitive psychology data; and
map the updated cognitive psychology profile to an identifier associated with the first user in the database.

16. The cognitive psychology processing system of claim 15, wherein the subsequently collected data includes image data collected by a camera of the first client device wherein the subsequently collected data is received from the first client device, and wherein the second cognitive psychology data is generated by utilizing a computer vision model.

17. The cognitive psychology processing system of claim 15, wherein the operational instructions, when executed by the at least one processor, further cause the cognitive psychology processing system to:
retrieve the cognitive psychology profile associated with the first user from the database;
generate volatility data based on comparing the second cognitive psychology data to the cognitive psychology profile;
map the volatility data to the identifier associated with the first user in the database; and
calculate the authentication threshold further based on the volatility data.

18. The cognitive psychology processing system of claim 12, wherein the operational instructions, when executed by the at least one processor, further cause the cognitive psychology processing system to:
select an initial set of cognitive psychology questions from the plurality of cognitive psychology questions for transmission to a second client device associated with a request to initialize an account for the first user;
receive an initial set of responses corresponding to the initial set of cognitive psychology questions;
generate the cognitive psychology profile based on the initial set of responses; and
map the cognitive psychology profile to an identifier associated with the first user in the database;
wherein selecting the set of cognitive psychology questions includes selecting cognitive psychology questions from the plurality of cognitive psychology questions not included in the initial set of cognitive psychology questions.

19. A computer readable storage medium comprises:
at least one memory that stores operational instructions that, when executed by a processing system that includes a processor, causes the processing system to:
receive a request to access a first secure resource by a first user;
calculate a spuriousness score, based on the request, that indicates a level of spuriousness of the request;
select a set of cognitive psychology questions from a plurality of cognitive psychology questions for transmission to a first client device associated with the request for display on a display device of the first client device via a user interface displayed on the display device;
receive a set of responses corresponding to the set of cognitive psychology questions, wherein the set of responses is generated by the first client device based on input to the user interface received via an input device of the first client device;
generate cognitive psychology data based on the set of responses;
retrieve a cognitive psychology profile associated with the first user from a database;
calculate an authentication score based on comparing the cognitive psychology data to the cognitive psychology profile;
calculate an authentication threshold by performing a function on the spuriousness score, wherein the authentication threshold is associated with a high level of spuriousness of the request, and wherein the authentication threshold corresponds to a match between the cognitive psychology data and the cognitive psychology profile for authentication success;

transmit an authentication success notification when the authentication score is greater than the authentication threshold; and transmit an authentication failure notification when the authentication score is less than the authentication threshold.

20. The computer readable storage medium of claim 19, wherein generating the cognitive psychology data includes calculating a first set of scores corresponding to a plurality of cognitive psychology characteristics, wherein the cognitive psychology profile includes a second set of scores corresponding to the plurality of cognitive psychology characteristics, and wherein calculating the authentication score includes comparing the first set of scores to the second set of scores.

* * * * *